United States Patent [19]

Henderson

[11] Patent Number: 4,700,927
[45] Date of Patent: Oct. 20, 1987

[54] SLIDE GATE

[75] Inventor: Robert W. Henderson, New Salem, Mass.

[73] Assignee: Rodney Hunt Company, Orange, Mass.

[21] Appl. No.: 929,920

[22] Filed: Nov. 12, 1986

[51] Int. Cl.$^4$ ................................................. F16K 3/14
[52] U.S. Cl. ..................................... 251/158; 49/488; 251/203; 251/329; 251/368
[58] Field of Search ............... 251/368, 158, 147, 203, 251/204, 326, 329; 49/488, 494

[56] References Cited

U.S. PATENT DOCUMENTS

| | | | |
|---|---|---|---|
| 1,979,490 | 11/1934 | Robertson | 49/488 |
| 2,560,308 | 7/1951 | Spraragen | 49/488 |
| 3,319,425 | 5/1967 | Andrae | 251/158 X |
| 3,351,180 | 11/1967 | Herzog et al. | 251/203 X |
| 3,704,722 | 12/1972 | Coleman | 251/203 X |
| 3,760,593 | 9/1973 | Whipps | 251/326 X |
| 3,980,094 | 9/1976 | Schroder et al. | 251/203 X |
| 4,131,131 | 12/1978 | Frisch | 251/203 X |

Primary Examiner—Martin P. Schwadron
Assistant Examiner—Stephen M. Hepperle
Attorney, Agent, or Firm—Samuels, Gauthier, Stevens & Kehoe

[57] ABSTRACT

A slide gate has a frame made up of parallel channel guides extending vertically from and cooperating with a horizontal bottom to define a gate opening. The channel guides each have mutually spaced first and second guide flanges protruding laterally into the gate opening. A gate disc is supported by the frame for vertical movement between a lowered position resting on the frame bottom and closing off the gate opening, and an open position spaced thereabove. The gate disc has side portions received between the first and second guide flanges of the channel guides, and these side portions carry seal assemblies. A plurality of vertically spaced pivotal pressure pads are mounted on each of the channel guides between their respective first and second guide flanges. Adjustable mechanisms are employed to pivotally adjust the pressure pads to bear against the disc side portions when the disc is in its lowered position, with the result that the seal assemblies are compressed between the disc side portions and the first guide flanges.

10 Claims, 6 Drawing Figures

SLIDE GATE

BACKGROUND OF THE INVENTION

1. Field of the Invention

This invention relates to slide gates having gate discs which are movable on guide frames between lowered closed positions and raised open positions.

2. Description of the Prior Art

Slide gates are well known and are widely employed to control fluid flow in a variety of applications, typical examples being water and sewage treatment facilities.

Conventional slide gates are unavoidably characterized by two conflicting design considerations. On the one hand is the requirement to establish a fluid tight relationship between the frame and disc when the latter is in the closed position. To this end, flexible seals are mounted between mating surfaces on the frame and disc, and means are provided for urging the disc against and in substantially constant frictional contact with the seals.

On the other hand, however, is the requirement to minimize frictional resistance to gate movement into and out of the closed position, while also minimizing frictional wear of the seals.

In the past, those skilled in the art have deemed it necessary to strike a compromise between these conflicting requirements. Thus, frictional seating forces have been reduced in order to minimize resistance to disc movement and seal wear, but at a cost of achieving less than optimum sealing integrity.

SUMMARY OF THE INVENTION

One object of the present invention is to maximize frictionally developed seating forces, thereby optimizing sealing integrity, while at the same time minimizing frictional resistance to disc movement.

A companion objective of the present invention is to provide an improved seal design which resists frictional wear while also contributing to a lowering of frictional resistance to disc movement.

In a preferred embodiment to be described hereinafter in greater detail, these and other objects and advantages are achieved by providing an open channel slide gate having a frame made up of parallel channel guides extending vertically from and cooperating with a horizontal bottom to define a gate opening. The channel guides have mutually spaced first and second guide flanges protruding laterally into the gate opening. A gate disc is supported by the frame for vertical movement between a lowered position resting on the frame bottom and closing off the gate opening, and an open position spaced thereabove. The gate disc has side portions received between the first and second guide flanges of the channel guides, and these side portions carry seal assemblies. A plurality of vertically spaced pivotal pressure pads are mounted on each of the channel guides between their respective first and second guide flanges. Adjustable mechanisms are employed to pivotally adjust the pressure pads to bear against the disc side portions when the disc is in its lowered position, with the result that the seal assemblies are compressed between the disc side portions and the first guide flanges.

Preferably, the side portions of the gate disc are provided with stepped pressure pads arranged to be acted upon by the pivotal pressure pads. The stepped pressure pads have varying thicknesses which graduate from the thinnest dimension at the bottom to the thickest dimension at the top. This insures that the gate disc is acted upon by a maximum seating force in the lowered position, with that force being relieved as the gate begins to move upwardly towards the open position.

Advantageously, each seal assembly comprises a flexible sealing element having an elongated body extending vertically along each disc side portion, with a pair of mutually spaced lips protruding therefrom. A retainer bar extends along the sealing element between the lips. When the gate disc side portions are urged towards the first guide flanges as a result of the seating force generated by the pivotal pressure pads, the sealing lips deflect outwardly with respect to each other against the first guide flanges until those flanges contact the retaining bars.

Preferably, the sealing elements are formed from a resilient material such as neoprene, and the retainer bars are formed from a low friction material such as a high molecular weight polyethylene.

DESCRIPTION OF PREFERRED EMBODIMENT

Figure 1:
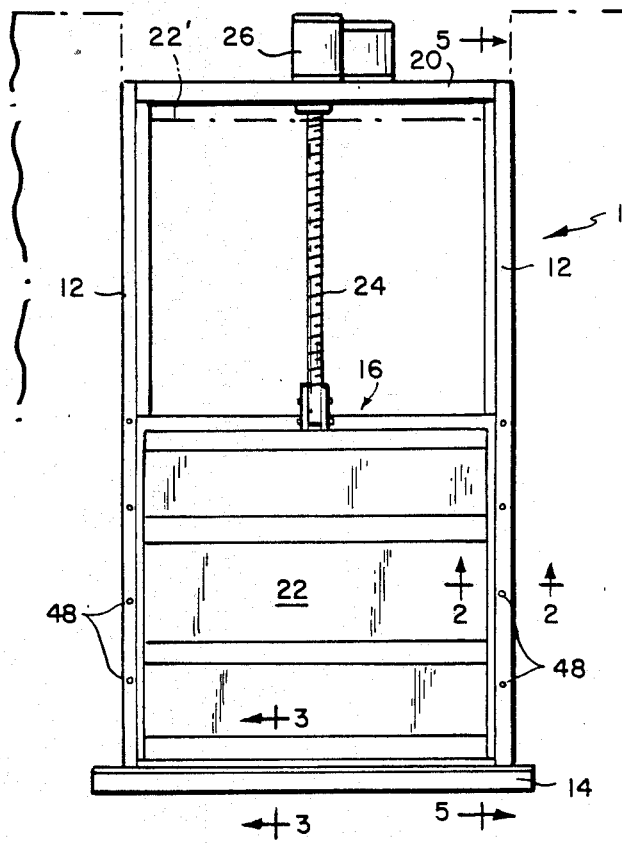
FIG. 1 is a view in front elevation of a slide gate in accordance with the present invention.

Referring now to the drawings, a slide gate is shown at 10 comprising a frame having channel guides 12 extending vertically from and cooperating with a bottom member 14 to define a gate opening 16. A cross piece 20 extends between the channel guides 12 above the bottom member 14 to complete the frame structure.

A gate disc 22 is supported by the frame for vertical movement between a lowered position resting on the frame bottom to close off the gate opening, as shown by the solid lines in FIG. 1, and an open position shown by the broken lines at 22'. The gate disc is adjusted between the lowered and raised positions by any convenient means, one example being a threaded spindle 24 extending from the gate disc to a motor powered drive 26.

Figure 3:
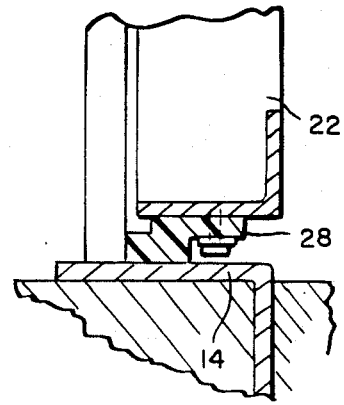
FIGS. 2 and 3 are enlarged partial sectional views taken respectively on lines 2—2 and 3—3 of FIG. 1.

As can be best seen in FIG. 3, the bottom of the gate disc carries a conventional seal 28 adapted to provide a sealing interface with the frame bottom 14 when the gate disc is lowered to its closed position.

The opposite sides of the slide gate are essentially mirror images of each other. Thus, and with reference to FIGS. 2 and 4–6, it will be seen that each channel guide 12 includes first and second mutually spaced guide flanges 12a, 12b integrally connected by a web 12c. The guide flanges 12a, 12b protrude laterally into the gate opening and side portions 22a of the gate disc are received therebetween.

Seal assemblies 30 are interposed between the rear faces of the gate disc side portions 22a and the first guide flanges 12a. Each seal assembly comprises a flexible sealing element 32 having an elongated body extending vertically along each gate disc side portion 22a, with a pair of lips 32a protruding therefrom. A retainer bar 36 overlies and extends along each sealing element 32 between the lips 32a. Preferably, the gate disc 22 and channel guides 12 will be fabricated from stainless steel, the sealing elements 32 will be molded or extruded from neoprene, and the retainer bars 36 will be formed from a high molecular weight polyethylene.

Metal retainer strips 38 are interposed between the sealing element bodies and the retainer bars. Bolts 40 or other like fasteners extend through the retainer bars 36, strips 38, sealing elements 32 and gate disc side portions 22a to removably fasten the sealing assemblies in place.

Figure 5:
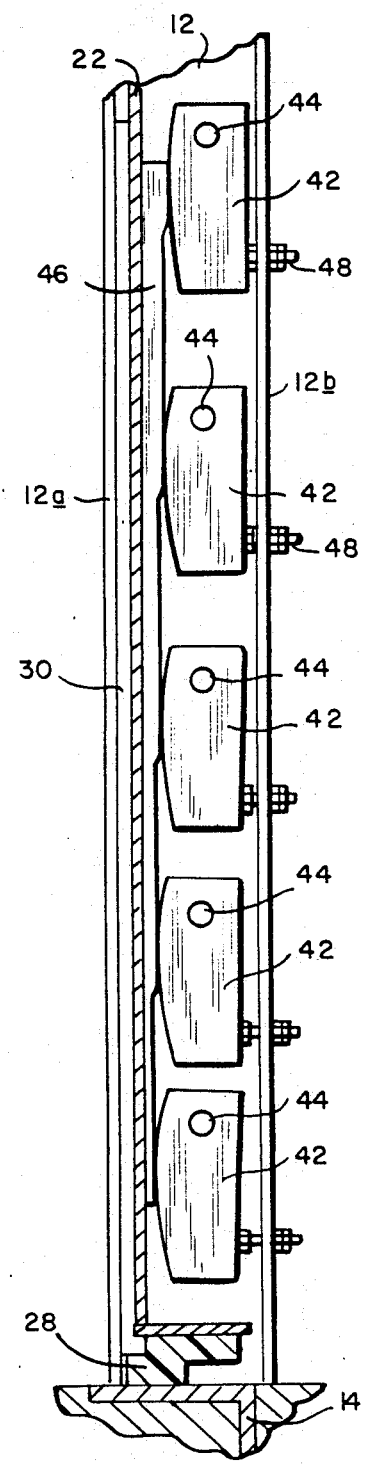
FIG. 5 is a sectional view taken on line 5—5 of FIG. 1.

A plurality of vertically spaced pressure pads 42 are pivotally mounted on each of the channel guides 12 by means of bolts 44 extending through the webs 12c. The pivotal pressure pads 42 are recessed between the first and second guide flanges 12a, 12b, and each is provided with a curved nose 42' adapted to act on a portion of a stepped seating element 46 attached to the front face of each respective gate disc side portion 22a. As is best shown in FIG. 5, the stepped seating elements 46 have their thickest dimensions located at the top of the gate disc, and their thinnest dimensions located at the bottom of the gate disc. The pivotal pressure pads are adjusted by means of screws 48 extending through the second guide flanges 12b. The screws 48 are threaded through nuts 50a welded to the flanges 12b. The screws are individually set and locked in place by lock nuts 50b.

Figure 6:
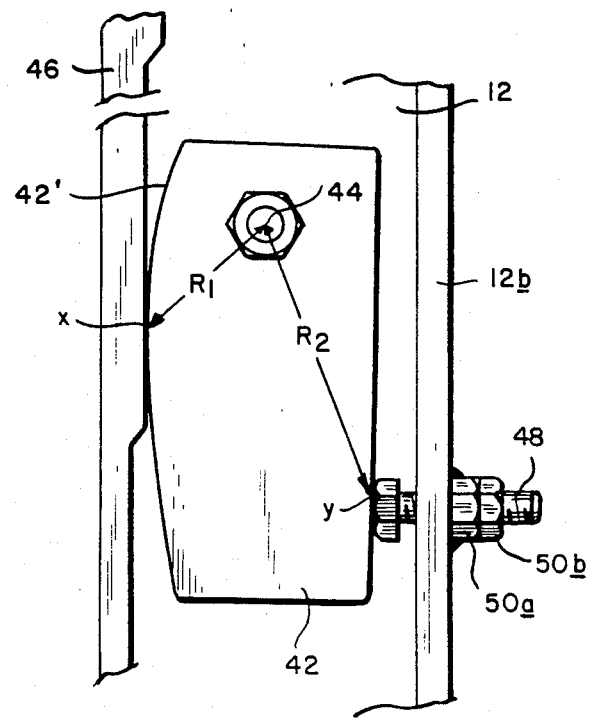
FIG. 6 is an enlarged elevational view of one of the pivotal pressure pads.

As can be best seen in FIG. 6, the nose 42' of each pivotal pressure pad 42 acts on a portion of the respective stepped seating element 46 at a contact point "x" spaced radially from the pressure pad pivotal axis by a distance $R_1$. By the same token, the adjusting screw 48 acts on the pivotal pressure pad at another contact point "y" spaced from the pivotal axis by a distance $R_2$.

With this arrangement, the force exerted at "y" by the adjusting screw 48 is multiplied by the mechanical advantage resulting from $R_2$ being greater than $R_1$, thus advantageously increasing the seating force exerted on the gate disc at "x". Moreover, as the gate disc is raised and lowered, the adjusting screws 48 are substantially isolated from shear stresses.

Figure 2:
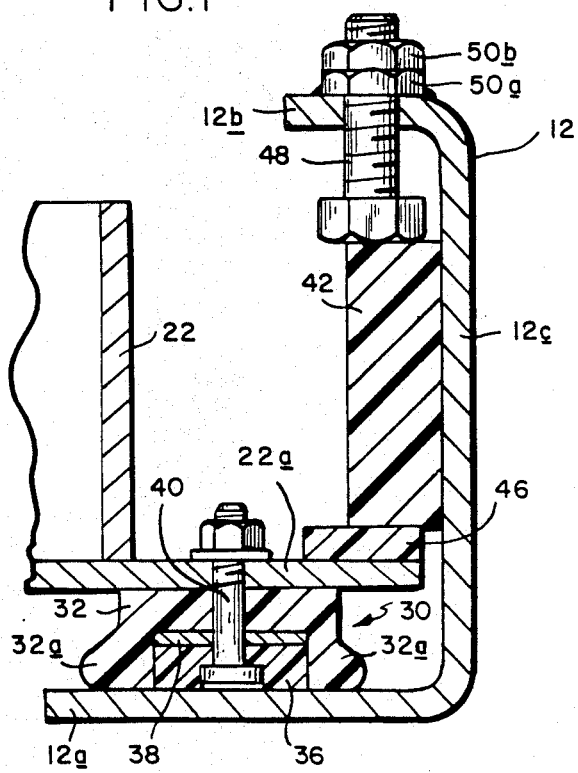
Figure 4:
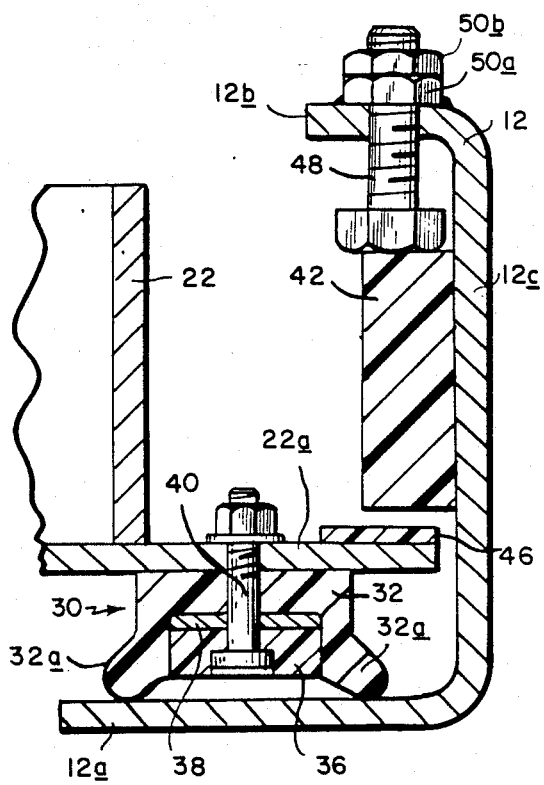
FIG. 4 is an enlarged sectional view similar to FIG. 2, but showing the relationship of certain components when the gate disc in a raised unseated condition.

During initial set up, the gate disc 22 is lowered to the closed position shown by the solid lines in FIG. 1, and the individual pivotal pressure pads 42 are then adjusted by means of the screws 48 to urge the disc side portions 22a towards the first guide flanges 12a, thereby compressing the seal assembles 30 therebetween, as shown in FIG. 2. Here it will be seen that as a result of being pressed against the first guide flanges 12a, the seal lips 32a have been deflected laterally outwardly with respect to each other, and the low friction retainer bar has been brought into face to face contact with the flange 12a.

When the gate disc is raised, the retainer bar 36 slides along the flange 12a, thereby protecting the body of the sealing element 32 from frictional wear, while at the same time reducing frictional resistance to disc movement. Because of the stepped configuration of the seating elements 46 on the gate disc, the seating force exerted by the pivotal pressure pads 42 is quickly relieved, thereby further descreasing frictional resistance to vertical gate disc movement. If the gate disc is being raised under "zero head" conditions, it will assume the position shown in FIG. 4 as soon as the seating force of the pivotal pressure pads 42 has been relieved. However, even if the gate disc continues to be urged towards the first guide flanges 12a by a fluid pressure head, the retainer bars 36 will act as low friction runners to ease vertical movement of the gate disc while protecting the sealing elements 32 from excessive frictional wear.

When the gate disc is lowered to its closed position, the retainer bars 36 will again serve to reduce frictional resistance. As the gate disc closely approaches the frame bottom, the pivotal pressure pads 42 will bear against respective portions of the stepped seating elements 46 to finally seat the gate disc with the seal assemblies compressed between the gate disc side portions 22a and the first flanges 12a.

Advantageously, the pivotal pressure pads 42 are also fabricated of a low friction material such as for example ultra high molecular weight polyethylene. This further reduces frictional resistance to vertical movement of the gate disc into and out of its closed position.

In light of the foregoing, it will be appreciated that the concepts of the present invention are equally applicable to closed channel gates where the gate opening is defined by an additional horizontal member overlying the bottom of the frame. In such cases, the disc would carry an additional seal positioned to be seated against that additional member in the closed position.

I claim:
1. A slide gate comprising:
    a frame including parallel channel guides extending vertically from and cooperating with a horizontal bottom to define a gate opening, said channel guides each having mutually spaced first and second guide flanges protruding laterially into said opening;
    a gate disc supported by said frame for vertical movement between a lowered position resting on said bottom and an open position spaced vertically therefrom, said gate disc having side portions received between the first and second guide flanges of said channel guides;
    seal assemblies interposed between said disc side portions and the respective first flanges of said channel guides;
    a plurality of vertically spaced pivotal pressure pads mounted on each of said channel guides, said pressure pads being arranged between each of said disc side portions and a respective one of said second guide flanges; and
    adjustment means for pivotally adjusting said pressure pads to bear against said disc side portions when the gate disc is in the lowered position, thereby urging said gate disc towards said first flanges to compress said seal assemblies between said disc side portions and said first flanges, said adjustment means comprising adjustment screws extending through said second guide flanges and bearing against said pressure pads at first contact points spaced radially from the pivotal axes of said pressure pads.
2. The slide gate of claim 1 wherein said pressure pads are provided with curved noses, and wherein said disc side portions are acted upon by said curved noses at second contact points located therealong.
3. The slide gate of claim 2 wherein said second contact points are spaced radially from the pivotal axes of said pressure pads.
4. The slide gate of claim 3 wherein the radial spacing of said first contact points from said pivotal axes is greater than that of said second contact points from said pivotal axes.

5. The slide gate of claim 1 further comprising vertically extending stepped seating elements on said disc side portions, said stepped seating elements being arranged to be acted upon by said pivotal pressure pads.

6. The slide gate of claim 5 wherein the stepped seating elements along each disc side portion have different thicknesses which cooperate with said pivotal pressure pads to reduce the force tending to urge the gate disc towards said first flanges when the gate disc is in other than the lowered position.

7. The slide gate of claim 1 wherein each seal assembly comprises a flexible sealing element having an elongated body with a pair of mutually spaced lips protruding therefrom, and retainer means for securing said body against a respective one of said gate disc side portions, with said lips being adapted to deflect laterally outwardly with respect to each other when urged into contact with a respective one of said first guide flanges.

8. The slide gate of claim 7 wherein said retainer means includes a bar overlying and extending along the length of said body between said lips, said bar being adapted to frictionally contact said first guide flange when said lips are deflected laterally outwardly with respect to each other.

9. The slide gate of claim 8 wherein said flexible sealing element is formed from neoprene, and wherein said bar is formed from a high molecular weight polyethylene.

10. The slide gate of claim 9 wherein said retainer means further comprises a metal strip interposed between said body and said bar, and fasteners extending through said bar, strip, body and gate disc side portion.

* * * * *